Patented June 22, 1937

2,084,526

UNITED STATES PATENT OFFICE 2,084,526

LUMINOUS PLASTIC SUBSTANCE AND ITS METHOD OF MANUFACTURE

Joseph Pierre Grenier, Paris, France, assignor to Société Francaise Helita, Paris, France, a corporation of France No Drawing. Application May 25, 1936, Serial No. 81,784. In France May 27, 1935

3 Claims. (Cl. 106—22)

The object of the present invention is a plastic substance luminous in its mass, its process of manufacture and its application to the production of luminous articles.

The basis employed for the preparation of said substance is plastic substances obtained by the condensation of formaldehyde and urea which has, over the luminous substances already known, the advantage of procuring perfect transparency both to visible rays and to ultraviolet rays of the supporting medium. Said transparency permits of an excellent luminous efficiency of the phosphorescent and fluorescent products contained within the substance both for the input flux of visible or of ultra-violet light serving to excite them and for the flux of visible light they emit. In addition, formaldehyde-urea substances possess a high refractive index making it possible to obtain, in articles provided with facets, particularly interesting light effects or sparkle. Said substance also offers the advantage of very readily acquiring the color of fluorescent coloring substances.

Said substance is obtained by incorporating one or more phosphorescent or fluorescent products with an urea and formaldehyde base plastic possessed of real transparency once the polymerization of said substance is completed. Such substances are well known in the technique of the art and are commonly met with in industry and trade.

According to the invention the luminescent substance is introduced in the form of a fine grain powder after condensation of urea with formaldehyde and prior to or during the process of acidification. It is known that this process consists in adding to the condensed liquid mass an anhydride mixed with an alcohol, for example ethylalcohol, and then boiling out the alcohol. The boiling which occurs during said process assures a regular distribution of the powder throughout the substance. The preparation of the plastic substance is then proceeded with according to the usual method; once said substance has reached the solid state the powder is definitely fixed within the mass.

As an example two processes of manufacture of formaldehyde and urea base phosphorescent and fluorescent substances will now be described below.

Example 1.—First 2.900 kilograms of commercial formaldehyde at 40 per cent in volume are taken and neutralized so that its pH may vary only within the limits of toning under red methyl by adding sesquicarbonate of ammonium.

1 kilogram of urea—400 grams of saccharose—15 grams of powdered zinc—20 grams of sodium chloride are then added to the neutralized formol in order to assure electric balance of the mass and 200 grams of a plasticizer such as the commercial products known under the name of cellulol and plastol.

The substance is then heated to boiling point while being stirred and boiling is continued under cohobation.

The product obtained is filtered in order to eliminate the zinc. Dehydration under a vacuum between 60° and 50° cent. is then carried out.

A mixture of 80 grams of denatured alcohol and 30 grams of acetic anhydride is prepared in a container. Said mixture is poured into the dehydrated substance while stirring rapidly, then 40 grams of phosphorescent zinc sulphide are dropped into said substance while stirring is continued.

De-alcoholization under a vacuum is then proceeded with until the temperature drops to 40° C. The substance is run into molds or polymerized in an oven at 70° C. then unmolded.

Operations are then continued as hereinabove.

The grains of powdered phosphorescent or fluorescent products must be selected very fine so as to impart uniform luminosity to the substance, or sufficiently large to preserve their individuality and provide a substance dotted with luminous points. Powders with different sized grains may also be mixed to obtain variegated effects.

If it is desired to obtain a concentration of the luminescence at the periphery of a solid of revolution or a reinforcement of said luminescence at the projecting points of a solid which is not of revolution it can be done by centrifugalization of the substance of said solid during hardening.

It is also possible to impart to the distribution of luminous products the characteristics which may result from the application of the vibratory processes applied in industry to assure certain distributions of the components of a mixture.

If it is desired to obtain substances which shall be luminous without the necessity of resorting to previous insolation known radio-active products will be incorporated with the luminous powders.

In order to provide against a reduction of the luminous activity which may sometimes occur as the result of chemical reactions between the components of the plastic substance and certain phosphorescent or fluorescent products at one time or another during the process of forming said substance, the luminescent products being present, the invention provides for the coating of the grains of luminescent substance with a transparent substance at a stage in the process of manufacture when it does not attack the luminescent products and is not attacked by the plastic substance itself nor by the various agents used in its manufacture. This method will be applied, in particular, to the case of calcium sulphide. As an example of a coating substance suitable for this particular application one may mention formaldehyde-urea base plastics of the same type as the incasing substance and which are brought into action when they are almost finished but prior to their polymerization, that is to say while they are still semi-liquid. Grains of luminescent products of a diameter of .5 millimeter for instance will be mixed with such a substance in this semi-liquid state; the substance in excess will be eliminated, for instance, by drainage; then the grains of luminescent products thus coated will be dropped into the plastic substance at the moment when the latter is being acidified and the luminescent substance will be protected against the action of the acid. Polymerization occurs simultaneously for the main mass of the plastic substance and for the substance coating the grains of luminous product. As another example one may also mention the protection of the luminescent products by causing them to remain in suspension in alcohol, ethyl alcohol for instance, said suspension being mixed with an organic anhydride, acetic anhydride for instance which is employed for the acidification of the plastic substance.

Any attack of the phosphorescent or fluorescent product is thus avoided and all its qualities are thus retained, and the phosphorescent or fluorescent product is uniformly distributed throughout the mass.

The present invention lends itself to the production of articles of the most varied shapes and aspects by all the known methods of forming formol-urea base plastic substances are capable of submitting to and in particular: casting, molding, machining etc.

I claim:

1. In the manufacture of a transparent formaldehyde-urea base mass, in which the product of the condensation of formaldehyde with urea is acidified by means of an anhydride mixed with an alcohol, and then de-alcoholized by boiling under vacuum, and poured into a mould, the step which consists in adding the luminescent substance in the form of a fine grain powder after condensation and at the latest during the boiling, in order that the boiling distribute the powder throughout the whole mass.

2. In the manufacture of a transparent formaldehyde-urea base mass according to claim 1, the complementary step which consists in subjecting the mass during hardening to a vibratory action in order to concentrate the luminescent powder in certain portions of the mass.

3. In the manufacture of a transparent formaldehyde-urea base mass of revolution according to claim 1, the complementary step which consists in subjecting the mass during hardening to a centrifugation in order to concentrate the luminescent powder in the external portions of the mass of revolution.

JOSEPH PIERRE GRENIER.